Aug. 5, 1952     T. S. BRISKIN     2,606,257
ELECTRIC ACTUATOR

Filed July 28, 1945     4 Sheets-Sheet 1

INVENTOR.
Theodore S. Briskin
BY
Zabel and Gritzbaugh
Attys

Aug. 5, 1952 — T. S. BRISKIN — 2,606,257
ELECTRIC ACTUATOR
Filed July 28, 1945 — 4 Sheets-Sheet 2

INVENTOR.
Theodore S. Briskin
BY Zabel and Fritzbaugh
Attys

Aug. 5, 1952 T. S. BRISKIN 2,606,257
ELECTRIC ACTUATOR
Filed July 28, 1945 4 Sheets-Sheet 3

INVENTOR.
Theodore S. Briskin,
BY
Zabel and Gritzbaugh
Attys.

Aug. 5, 1952     T. S. BRISKIN     2,606,257
ELECTRIC ACTUATOR
Filed July 28, 1945     4 Sheets-Sheet 4
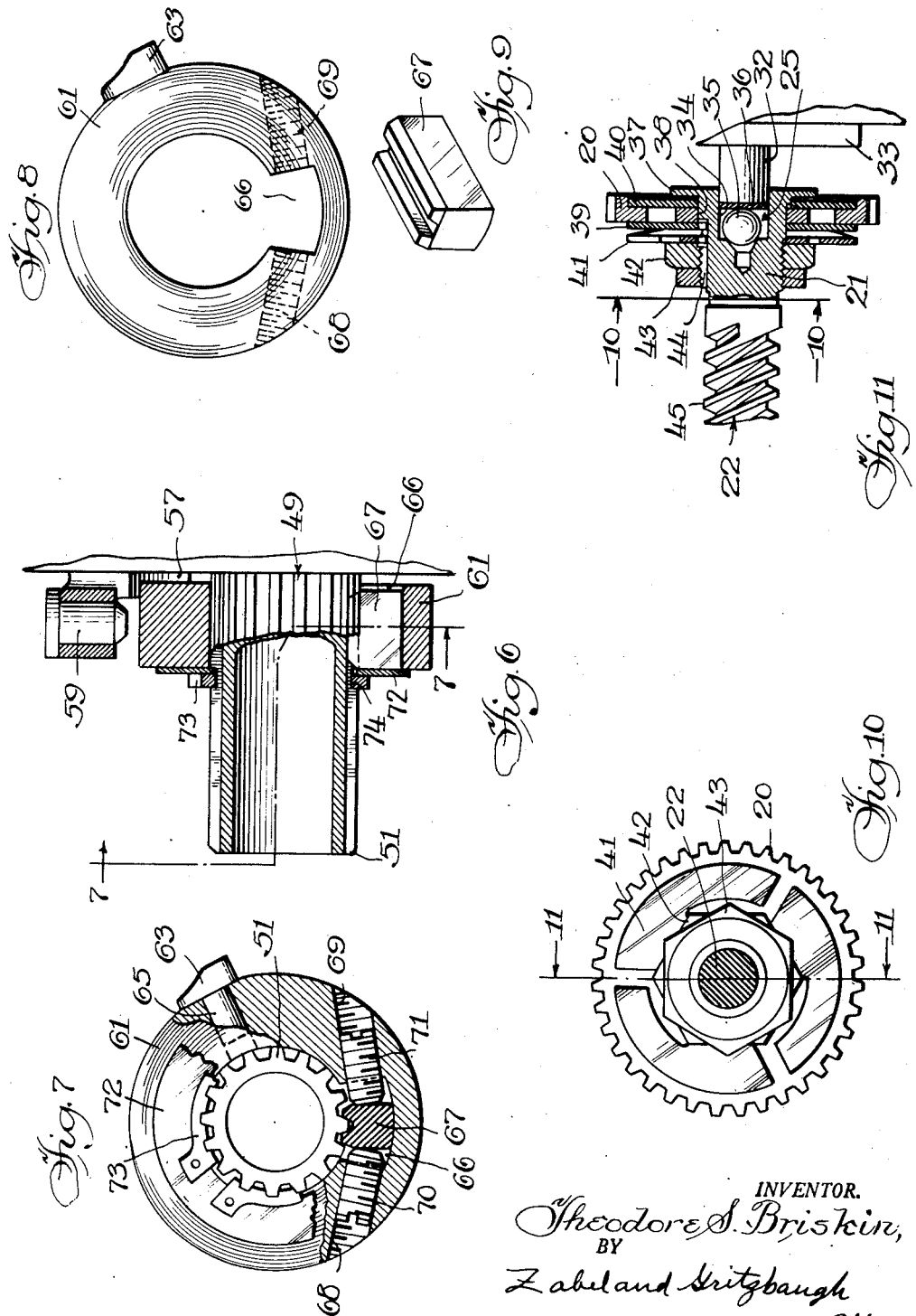
INVENTOR.
Theodore S. Briskin,
BY
Zabel and Fritzbaugh
Attys.

Patented Aug. 5, 1952

2,606,257

UNITED STATES PATENT OFFICE 2,606,257

ELECTRIC ACTUATOR

Theodore S. Briskin, Chicago, Ill., assignor to Revere Camera Company, Chicago, Ill., a corporation of Delaware Application July 28, 1945, Serial No. 607,542

3 Claims. (Cl. 200—47)

This invention relates to an improved electric actuator of a type to drive an element, such as a valve, a limited extent in either direction.

Devices of this sort often comprise a small high speed electric motor, together with reduction gearing so that considerable torque may be delivered by an output shaft.

It is an object of this invention to provide an electric actuator comprising a motor and reduction gearing which are so arranged as to provide a unit of small dimensions and capable of delivering a comparatively large torque.

It is a further object to provide in an electric actuator of the type described, a combined thrust bearing and clutch of improved construction which is adapted for use under conditions where a relatively small space is available.

Another object of this invention is to provide in a reversible electric actuator, an improved arrangement of limit switches and operating cams therefor, and in particular, to provide an improved cam construction which is capable of very fine adjustment.

Another object is to provide an electric actuator of improved construction having a comparatively small number of parts and which is simple to manufacture, and which is positive and efficient in its operation.

Other objects, features and advantages will become apparent as this description proceeds.

With reference now to the drawings, which illustrate a preferred embodiment of this invention, in which like reference numerals designate like parts, Fig. 1 is a side elevation of an electric actuator;

Fig. 6 is an enlarged detail section taken along line 6—6 of Fig. 1;

Fig. 7 is a section along line 7—7 of Fig. 6;

Fig. 8 is a detail elevation of the cam carrying collar;

Fig. 9 is a detail view of the adjusting block;

Fig. 10 is a detail view of the combined thrust bearing and clutch, taken along line 10—10 of Fig. 11;

Fig. 11 is a section taken along line 11—11 of Fig. 10.

With reference now to the drawings, the actuator comprises a motor, not shown, which is disposed in a motor housing 13, a gear housing 14 having a cover plate 15, and a top shell 16.

Figure 5:
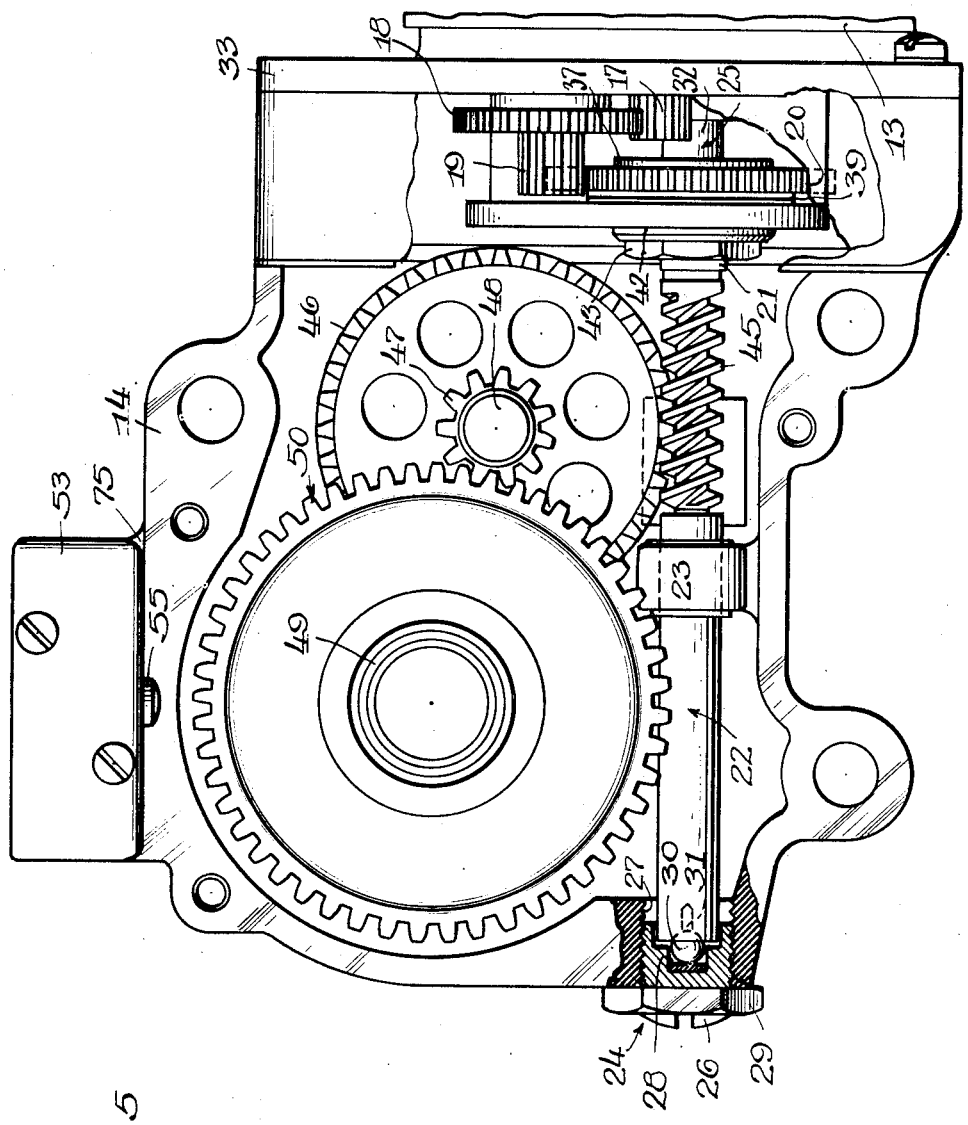
Fig. 5 is an enlarged side elevation of the reduction gearing, with the cover of the gear housing removed.

Power is supplied to the unit from the pinion 17 of the drive shaft of the motor, this pinion driving a gear 18 and associated pinion 19, the latter pinion meshing with a driving gear 20 which is rotatably mounted on a hub 21. The hub 21 is formed integrally with a worm shaft 22 which is journaled in a bearing 23 projecting upwardly from the bottom wall of the gear housing 14. Thrust bearings generally designated by the reference numerals 24 and 25 are provided at the left and right hand end of the shaft respectively, as viewed in Fig. 5, and the thrust bearing 25 also provides bearing means which cooperate with bearing 23 to maintain the shaft in alignment with the other parts of the device.

The thrust bearing 24 includes a screw threaded plug 26 which is received within a tapped bore in the end wall of the gear housing 14. The plug is provided with a recess 27 in which is disposed a small wear plate 28. A jam nut 29 assists in locking the plug 26 in a predetermined axial position. A ball bearing 30 is disposed within recess 27, and bears against the walls of a conical bore 31 formed at the left end of the worm shaft 22. Thus, a suitable thrust bearing is provided for the left end of the shaft.

A stud 32 projects inwardly from an end plate 33, the latter being suitably secured to the gear housing 14. The stud 32 is axially aligned with the worm shaft 22, and is received within a bore 34 formed in the hub portion 21 of the shaft 22. The inner end of the bore 34 has conically shaped walls which provide a bearing surface for a ball bearing 35. A wear plate 36 is suitably disposed at the end of the stud 32. Thus the thrust of the worm shaft 22 in either direction is provided for. The cylindrical walls of the stud 32 provide a bearing support for the right end of the worm shaft.

The hub 21 is provided with an end flange 37, and also a shoulder 38, and is confined between washers 39 and 40. A spring washer 41, shown in detail in Figs. 10 and 11, bears against the washer 39 and serves to provide a clutching action by means of which the rotation of gear 20 may be transmitted to the worm shaft 22. The spring washer 41 and washer 39 are keyed to the hub, the latter being provided with a keyway 44. Adjusting nut 42 and lock nut 43, which are threaded on to the hub 21, provide a means for regulating the slippage of the clutch.

The worm shaft 22 is provided with a worm 45 which engages a worm wheel 46 mounted on a shaft 48 which is journaled in the gear housing 14 and cover 15. A pinion 47 is secured to the worm wheel and meshes with a gear 50 which is secured to a tubular output shaft 49, the latter also being journaled in the housing 14 and cover plate 15.

In operation, it will be seen that the high speed rotation of the motor driven pinion 17 is reduced by the gearing 18 to 20, inclusive, the worm 45 and its associated gearing in such a manner that the output shaft 49 is capable of delivering a comparatively high torque.

The operation of the motor, which in electric actuators of this type, is commonly provided with an additional field winding for reversible operation, is controlled by two micro-switches 53 and 54, one being provided for forward operation, and the other for reversed operation. These micro-switches are suitably secured to a web 75 which projects from the upper surface of the gear housing 14. The micro-switches are provided with the usual operating plungers 55 and 56.

Projecting from the side surfaces of the motor housing 14 and the cover plate 15, are brackets 57 and 58 which carry pins 59 and 60 in a position immediately below the plungers 55 and 56. The arrangement is such that displacement of the pins 59 and 60 opens a circuit through the micro-switches 53 and 54.

Collars 61 and 62 are mounted on the splined projecting ends 51 and 52, respectively, of the output shaft 49. The collars carry cams 63 and 64, respectively, the position of the cams being such that they will engage the pins 59 and 60 to open the motor circuit, thereby providing a limit to the rotation of the output shaft in either direction.

Figure 1:
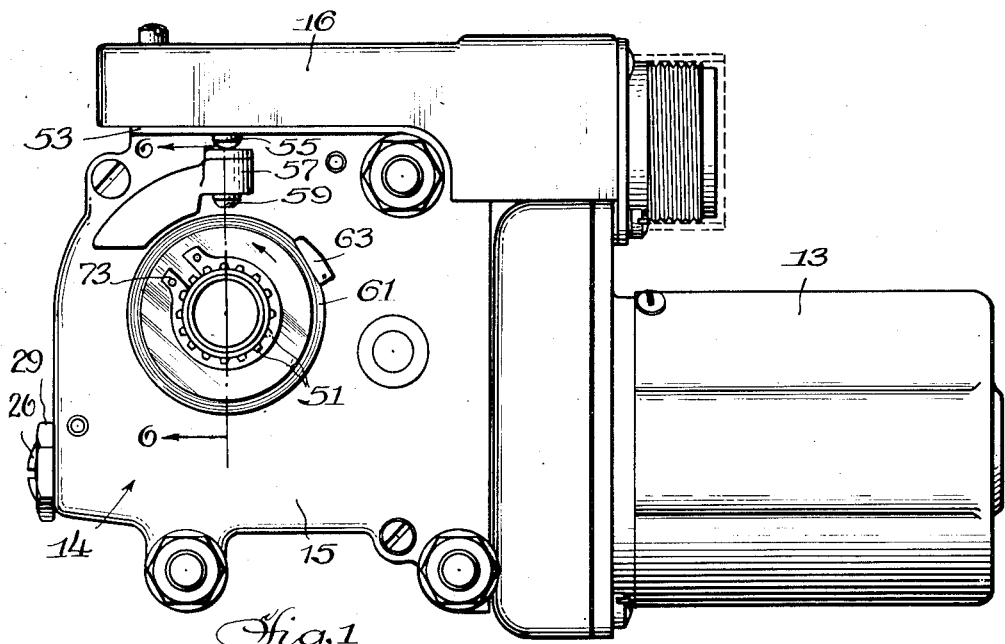
Figure 2:
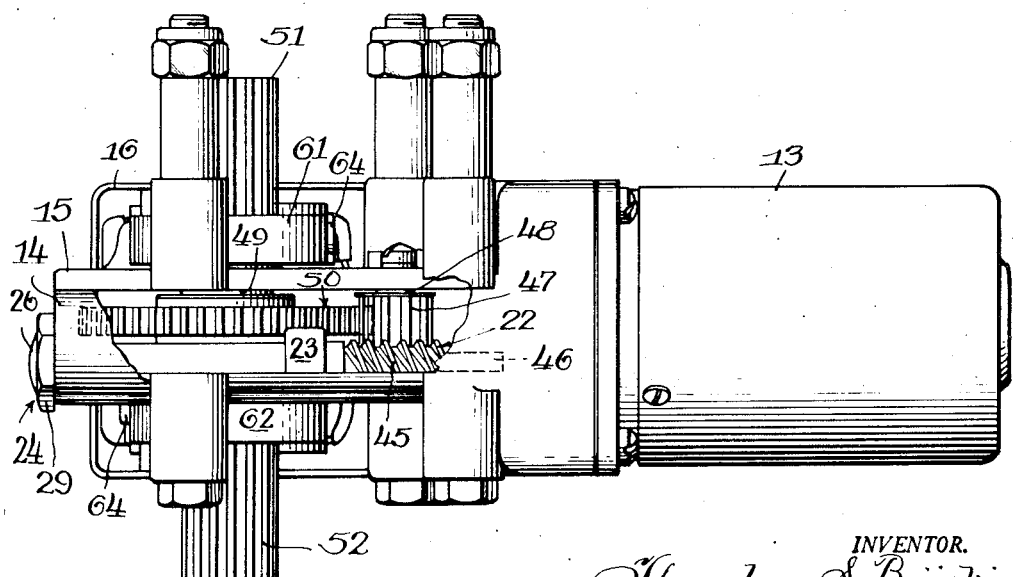
Fig. 2 is a bottom view thereof, a portion of the gear housing being broken away.
Figure 3:
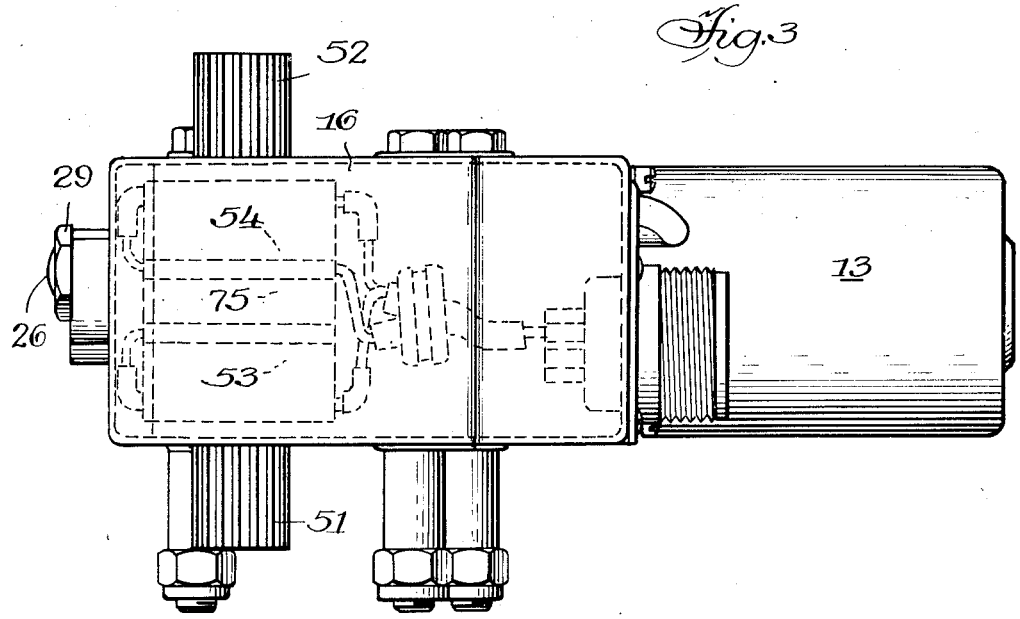
Fig. 3 is a top view.
Figure 4:
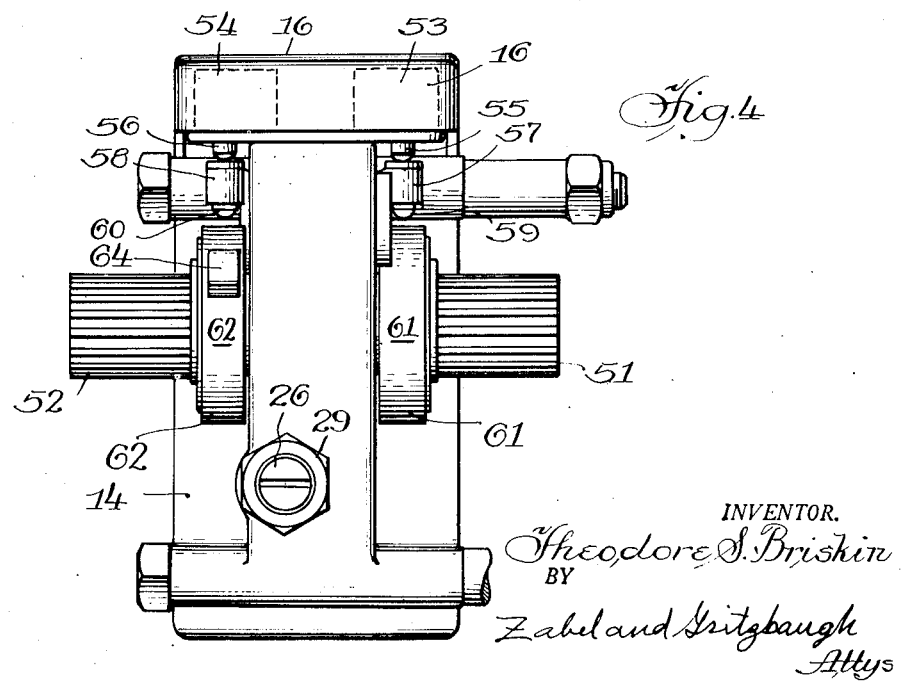
Fig. 4 is an end view.

The circuit through the micro-switches is normally closed, with the result that the motor may be operated in either the forward or the reverse direction, depending upon whether the forward field or reverse field of the motor is energized. Upon the energization of one or the other of these circuits, however, the output shaft 49 will be rotated until such time as one or the other of the cams 63 or 64 engages its respective pin to open the respective field circuit. As shown in Fig. 1, rotation of the shaft 49 in a counterclockwise direction is limited by the position of the cam 63, whereas rotation in the opposite direction is limited by the position of the cam 64, as shown in Fig. 4.

Means are provided to permit an adjustment of the position of the cams to a fine degree, such means being shown in detail in Figs. 6 to 9, inclusive. The cam 63 is mounted on a pin 65 which is received within a bore in the collar 61, the position of the collar 61 with respect to the end 51 of the shaft 49 determining the position of the cam. The collar is provided with a slot 66, and a toothed block 67, as shown in Fig. 9, is disposed within the slot. The width of the block 67 is considerably less than the width of the slot 66, and its lateral position in the slot is determined by set screws 70 and 71, which take into tapped bores 68 and 69 in the collar 61. It will be seen that the depth of the slot is such that the toothed block interlocks with the teeth of the splined end 51, and by adjusting the set screws 70 and 71, the angular position of the collar can be shifted to the extent of one tooth width or greater, to either side of a median position. Thus an extremely fine adjustment is provided, despite the fact that the toothed block is capable of being positioned only at definite intervals which correspond to the spacing between adjacent teeth.

An annular groove 74 is provided in the splines, and a snap ring 73 fits into the groove and serves to hold the collar 61 in position. A washer 72 is disposed between the snap ring and the collar. Thus the parts may be readily removed from the splined end 51 in order to reposition the toothed block 67.

The collar 62 and its associated cam 64 are adjustably mounted on the splined end 52 of the output shaft in the same manner as described with respect to collar 61.

The operation of the device is such that if the output shaft 49 is stalled or jammed, the clutch which comprises the friction washers 39 and 40, and the spring washer 41, will protect the motor for a considerable length of time, and due to the provision of separate friction washer 39 which is interposed between the spring washer 41 and the surface of the gear 20, the action of the clutch is the same in either direction of rotation. By regulating the adjusting nut 42, the clutch may be set for any desired load.

Although only a preferred embodiment of this invention has been shown and described herein, it is understood that various modifications and changes may be made without departing from the spirit of this invention as defined by the appended claims.

I claim:

1. In a reversible electric actuator of the type described having an output journaled intermediate its ends, two cams removably mounted on said output shaft, one on each end thereof and limit switches operated by said cams to control the operation of said actuator, means for adjustably mounting each of said cams on said output shaft comprising a series of teeth provided on said output shaft, a collar rotatably mounted on said output shaft and surrounding said teeth, one of said cams being mounted on said collar, a slot formed in the inner cylindrical surface of said collar, a tooth engaging member disposed in said slot, the width of said slot being greater than the width of said tooth engaging member, and means for adjusting the position of said tooth engaging member with respect to said slot in order to adjust the angular disposition of said collar and said cam with respect to said output shaft for effecting angular adjustments of small degree, said cams being removable over the ends of said shaft to effect angular adjustments of large degree.

2. In combination, a splined shaft, a cam disposed on said shaft, and means for adjustably mounting said cam on said shaft comprising a collar rotatably mounted on said splined shaft, said cam being mounted on said collar, a slot formed in the inner cylindrical surface of said collar, a toothed block disposed in said slot and engaging said splined shaft, the width of said slot being greater than the width of said toothed block, and adjustable means extending into said slot and engaging the opposite sides of said toothed block, for adjusting the position of said toothed block with respect to said slot in order to adjust the angular disposition of said collar and said cam with respect to said shaft.

3. Means for adjustably mounting a cam on a splined shaft having a series of teeth provided on said shaft comprising, a collar rotatably mounted on said shaft and surrounding said teeth, said cam being mounted on said collar, a slot formed in the inner cylindrical surface of said collar, a tooth engaging member disposed in said slot, the width of said slot being greater than the width of said tooth engaging member, said collar being provided with oppositely disposed tapped bores extending from the outer cylindrical surface of said collar into communication with the opposite walls of said slot, and screws disposed in said bores and engaging the opposite sides of said tooth engaging member whereby the position of said tooth engaging member with respect to said slot may be regulated.

THEODORE S. BRISKIN.

REFERENCES CITED

The following references are of record in the file of this patent:

UNITED STATES PATENTS

| Number | Name | Date |
|---|---|---|
| 284,860 | Jones | Sept. 11, 1883 |
| 349,005 | Sargent | Sept. 14, 1886 |
| 774,155 | Butterfield | Nov. 8, 1904 |
| 1,452,221 | Slider | Apr. 17, 1923 |
| 1,651,959 | Meyers | Dec. 6, 1927 |
| 1,684,679 | Nixon | Sept. 18, 1928 |
| 1,748,509 | Forman | Feb. 25, 1930 |
| 1,901,916 | McCoy | Mar. 21, 1933 |
| 1,911,021 | Gunther et al. | May 23, 1933 |
| 2,029,821 | Hathaway | Feb. 4, 1936 |
| 2,046,283 | Berlyn | June 30, 1936 |
| 2,050,542 | Pace | Aug. 11, 1936 |
| 2,073,967 | Kiefer | Mar. 16, 1937 |
| 2,114,013 | Ball | Apr. 12, 1938 |
| 2,328,897 | Gill | Sept. 7, 1943 |
| 2,333,980 | Branson | Nov. 9, 1943 |
| 2,437,591 | Briskin et al. | Mar. 9, 1948 |
| 2,469,269 | Lear | May 3, 1949 |
| 2,469,570 | Parish | May 10, 1949 |
| 2,479,975 | Shively | Aug. 23, 1949 |

FOREIGN PATENTS

| Number | Country | Date |
|---|---|---|
| 4,681 | Great Britain | of 1904 |